United States Patent [19]

Chijiiwa

[11] Patent Number: 4,831,464

[45] Date of Patent: May 16, 1989

[54] SIGNAL RECORDING CONDITIONING DEVICE

[75] Inventor: Masaru Chijiiwa, Saitama, Japan

[73] Assignee: Pioneer Electronic Corporation, Tokyo, Japan

[21] Appl. No.: 126,376

[22] Filed: Nov. 30, 1987

[30] Foreign Application Priority Data

Nov. 28, 1986 [JP] Japan ................................. 61-283974

[51] Int. Cl.⁴ .............................................. G11B 5/00
[52] U.S. Cl. ..................................................... 360/32
[58] Field of Search ..................... 360/32, 27; 340/374

[56] References Cited

U.S. PATENT DOCUMENTS 4,626,158 10/1986 Yasukawa ............................. 360/32

Primary Examiner—Vincent P. Canney
Attorney, Agent, or Firm—Sughrue, Mion, Zinn, Macpeak & Seas

[57] ABSTRACT

In a signal recording circuit, a dither signal in a frequency band of from a frequency higher than ½ of the sampling frequency of a recording signal to a frequency lower than (n−½) of the sampling frequency (where n is an integer larger than 1) is added to the recording signal in an addition circuit, and the output of the addition circuit is subjected to analog-to-digital conversion with a frequency n times the sampling frequency.

3 Claims, 1 Drawing Sheet

SIGNAL RECORDING CONDITIONING DEVICE

BACKGROUND OF THE INVENTION

1. Field Of The Invention

This invention relates to a signal recording device which is represented typically by an R-DAT (rotary head-digital audio tapedeck).

2. Background Art

In an R-DAT or the like, an analog audio signal, which is a recording signal, is converted from analog-to-digital (A/D) form so that it is recorded in the form of a digital signal on the magnetic tape. In the quantization of an analog signal, a quantizing distortion occurs. Hitherto, a dither signal is used as a random noise to eliminate the quantizing distortion.

FIG. 1 is a block diagram showing a signal recording device in which a signal is recorded with the dither signal. In FIG. 1, an analog audio signal is applied to an input terminal. A digital noise generating circuit 6 generates digital noise as the dither signal. The digital noise generated by the noise generating circuit 6 is subjected to D/A (digital-to-analog) conversion in a D/A converter circuit 7. The output of the D/A circuit 7 is applied to an addition circuit 2 where it is added to the analog audio signal. The output of the addition circuit 2 is applied to an A/D converter circuit 3, where it is subjected to A/D conversion. The output of the A/D converter circuit 3 is applied to a subtraction circuit 4.

The digital noise generated by the digital noise generating circuit 6, after being delayed for a predetermined period of time by a delay circuit 8 (corresponding to the sum of delay times in the D/A converter circuit 7, the addition circuit 2 and the A/D converter circuit 3), is applied to the subtraction circuit 4. In the subtraction circuit 4, the digital noise is subtracted from the output signal of the A/D converter circuit 3 and the result of subtraction is provided at its output terminal 5. The signal thus provided at the output terminal 5 is applied to the rotary head so as to be recorded on the magnetic tape.

In the above-described method, the recording signal is added to the dither signal before being subjected to A/D conversion and, therefore, the quantizing distortion can be decreased at the A/D conversion.

However, in the signal recording device thus organized, for sufficient effect it is essential that the A/D converter circuit 3 and the D/A converter circuit 7 are uniform in accuracy and in quantization characteristic. Furthermore, if the frequency of the digital noise is set in the audio frequency band, then the S/N ratio is lowered.

SUMMARY OF THE INVENTION

Accordingly, an object of this invention is to eliminate the above-described difficulties accompanying a conventional signal recording device.

The foregoing object and other objects of the invention have been achieved by the provision of a signal recording device which, according to the invention, includes a dither signal generating circuit for generating a dither signal in a frequency band extending from a frequency higher than $\frac{1}{2}$ of a recording signal sampling frequency to a frequency lower than $(n-\frac{1}{2})$ of the recording signal sampling frequency. An addition circuit adds the dither signal to a recording signal. An analog-to-digital converter circuit subjects an output of the addition circuit to analog-to-digital conversion with a frequency which is n times the sampling frequency. A digital filter removes a high frequency component from an output of the analog-to-digital converter circuit. A sampling circuit samples an output of the digital filter with the sampling frequency.

The nature, principle and utility of the invention will become more apparent from the following detailed description when read in conjunction with the accompanying drawings.

DETAILED DESCRIPTION OF THE PREFERRED EMBODIMENT

Figure 2:
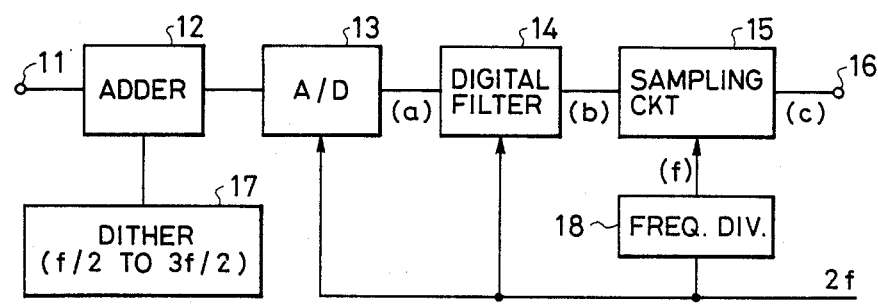
FIG. 2 is a block diagram showing one example of a signal recording device according to this invention.

FIG. 2 is a block diagram showing one example of a signal reording device, which is applied to an R-DAT, according to this invention.

Figure 1:
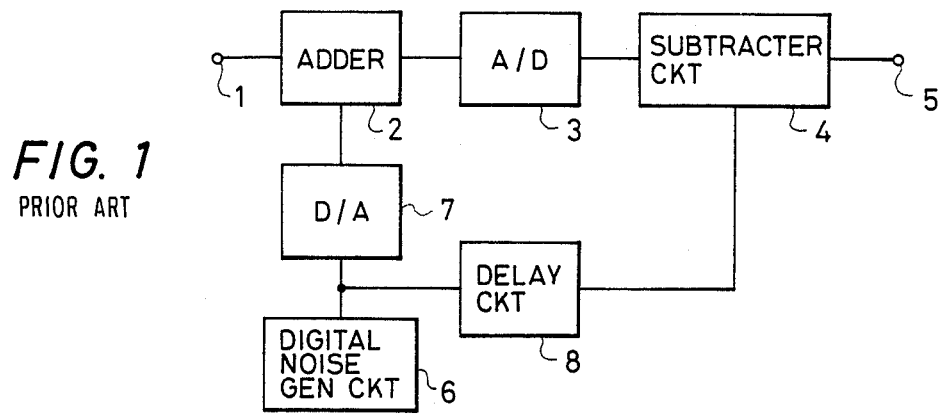
FIG. 1 is a block diagram showing a conventional signal recording device.

The signal recording device, as shown in FIG. 1 includes an input terminal 11 to which a recording signal, namely, an analog audio signal is applied. In an addition circuit 12, the audio signal is added to a dither signal outputted by a dither signal generating circuit 17. An A/D (analog-to-digital) converter circuit 13 converts the output of the addition circuit from analog-to-digital form. A digital filter 14 operating as a high-cut filter cuts off the high frequency component of the output of the A/D converter circuit 13. A sampling circuit 15 samples its input signal. The output of the sampling circuit 15 is applied to an output terminal 16.

The analog audio signal from the input terminal 11 is applied to the addition circuit 12 where it is added to the dither signal outputted by the dither signal generating circuit 17. The output of the addition circuit 12 is applied to the A/D converter circuit 13, where it is subjected to A/D conversion.

When the final sampling frequency of the audio signal is f, the sampling frequency of the A/D converter circuit 13 is n×f (where n is an integer), for instance 2f. That is, oversampling is performed. Accordingly, the quantization error is decreased. In addition, it is unnecessary to provide an analog filter (or low-pass filter) with a steep characteristic in the front stage of the A/D converter circuit 13. Accordingly, the irregularity of the phase characteristic attributed to the analog filter can be eliminated.

Figure 3A:
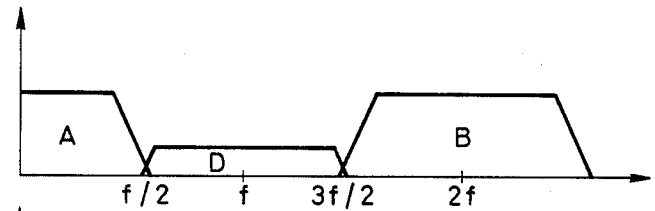
FIGS. 3A through C is a spectrum diagram for a description of the operation of the signal recording device shown in FIG. 1.
Figure 3B:
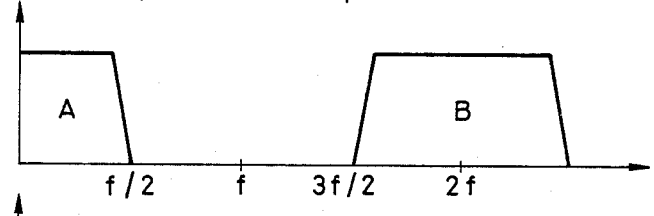
Figure 3C:
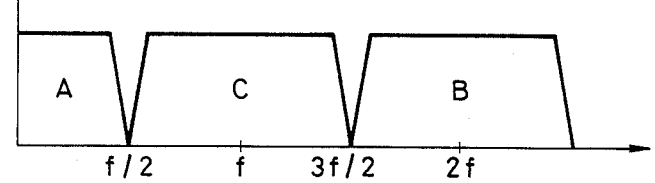

The spectrum of the PAM signal quantized by the A/D converter circuit 13 is as shown in trace (a) of FIG. 3. In trace (a), there is shown a recording signal A, or audio signal component, its aliasing component B, and a dither signal component D. The dither signal D is set in a relatively wide frequency band of from f/2 to 3f/2 (n=2). If the dither frequency is made lower than f/2, then the dither signal enters the audio frequency band, thus overlapping the audio signal A. If it is made higher than 3f/2, then the aliasing components B are involved. Therefore, it is preferable that the frequency band of the dither signal is set as described above.

The output of the A/D converter circuit 13 is applied to the digital filter 14 driven with a clock pulse having a frequency of 2f, in which the audio signal higher in frequency than f/2 is suppressed. In this operation, the phase characteristic will not be disturbed, because the digital filter is used.

The frequency of the dither signal D is set to a value larger than f/2. Therefore, in the digital filter 14, the dither signal D together with the high frequency component of the audio signal A is removed, but the aliasing signal B remains. Accordingly, the spectrum of the output of the digital filter 14 is as shown in trace (b) of FIG. 3.

The output of the digital filter 14 is applied to the sampling circuit 15. In the sampling circuit 15, the input data over-sampled with a frequency of 2f is sample intermittently with the aide of a clock pulse having a frequency of f so that data sampled at a frequency of f is finally provided. A clock signal at a frequency of 2f directly controls the A/D converter circuit 13 and the digital filter 14 but is frequency divided to f by a frequency divider 18 for controlling the sampling circuit 15. The spectrum of the output of the sampling circuit 15 is as shown in trace (c) of FIG. 3, in which the aliasing component C is provided by the sampling operation with a frequency of f.

As was described above, the signal recording device of the invention comprises: the dither signal generating circuit for generating a dither signal in a frequency band of from a frequency higher than $\frac{1}{2}$ of the recording signal sampling frequency to a frequency lower than $(n-\frac{1}{2})$ of that frequency; the addition circuit for adding the dither signal to the recording signal; the A/D converter circuit for subjecting the output signal of the addition circuit to A/D conversion with a frequency n times the sampling frequency; the digital filter for removing a high frequency component from the output of the A/D converter circuit; and the sampling circuit for sampling the output of the digital filter with the sampling frequency. Therefore, the signal recording device of the invention, being simple in arrangement, can minimize the quantizing distortion without decreasing the S/N ratio.

What is claimed is:

1. A signal recording conditioning device, comprising:
   a dither signal generating circuit for generating a dither signal in a frequency band extending from a frequency higher than $\frac{1}{2}$ of a recording signal sampling frequency to a frequency lower than $(n-\frac{1}{2})$ of said recording signal sampling frequency wherein n is an integer greater than 1;
   an addition circuit for adding said dither signal to a recording signal;
   an analog-to-digital converter circuit for subjecting an output of said addition circuit to analog-to-digital conversion with a frequency which is n times said sampling frequency;
   a digital filter for removing a high frequency component from an ouput of said analog-to-digital converter circuit; and
   a sampling circuit for sampling an output of said digital filter at said sampling frequency.

2. A conditioning device as recited in claim 1, wherein n=2.

3. A conditioning device as recited in claim 1, wherein said digital filter suppresses components of said output of said analog-to-digital converter extending from a frequency of $\frac{1}{2}$ of said recording sampling frequency to a frequency of $(n-\frac{1}{2})$ of said recording sampling frequency.

* * * * *